United States Patent
Zainalabedin et al.

(10) Patent No.: US 12,497,886 B2
(45) Date of Patent: Dec. 16, 2025

(54) THREE-DIMENSIONAL RESERVOIR MAPPING FOR DRILLING HYDROCARBON WELLS

(71) Applicant: Saudi Arabian Oil Company, Dhahran (SA)

(72) Inventors: Khalid A Zainalabedin, Dhahran (SA); Ayman Elkhamry, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/508,803

(22) Filed: Nov. 14, 2023

(65) Prior Publication Data

US 2025/0154861 A1     May 15, 2025

(51) Int. Cl.
E21B 7/04     (2006.01)
E21B 44/00    (2006.01)
E21B 49/00    (2006.01)

(52) U.S. Cl.
CPC ............... *E21B 44/00* (2013.01); *E21B 7/04* (2013.01); *E21B 49/00* (2013.01); *E21B 2200/20* (2020.05)

(58) Field of Classification Search
CPC .... E21B 44/00; E21B 44/005; E21B 2200/22; E21B 7/04; E21B 7/10; E21B 7/06; E21B 2200/20
See application file for complete search history.

(56) References Cited

U.S. PATENT DOCUMENTS

| | | | |
|---|---|---|---|
| 11,054,541 B2 | 7/2021 | Donderici et al. | |
| 12,078,048 B2 * | 9/2024 | Yu | G06N 3/045 |
| 2008/0239871 A1 * | 10/2008 | Thevoux-Chabuel | G01V 1/50 367/27 |
| 2011/0088895 A1 * | 4/2011 | Pop | E21B 44/00 166/254.2 |
| 2015/0240615 A1 * | 8/2015 | Dykstra | E21B 44/00 700/275 |
| 2017/0037721 A1 * | 2/2017 | Lovorn | E21B 47/02 |
| 2019/0147125 A1 | 5/2019 | Yu et al. | |
| 2020/0011158 A1 | 1/2020 | Xu et al. | |
| 2020/0277848 A1 * | 9/2020 | Johnston | E21B 44/00 |
| 2020/0308952 A1 | 10/2020 | Pounazari et al. | |
| 2021/0124087 A1 * | 4/2021 | Liu | G06F 30/28 |

(Continued)

FOREIGN PATENT DOCUMENTS

CA          3047923 A1    7/2021

OTHER PUBLICATIONS

Elkhamry et al., "Real-Time 3D Anisotropy Analysis Enables Lithology Identification at Distance," presented at the SPWLA 63rd Annual Logging Symposium, Stavanger, Norway, Jun. 14, 2022, 8 pages.

(Continued)

*Primary Examiner* — Kipp C Wallace
(74) *Attorney, Agent, or Firm* — Fish & Richardson P.C.

(57) ABSTRACT

Systems and methods are for autonomous real-time 3D interactive planning and execution of well paths in a reservoir and controlling drilling of wells within the reservoir. A data processing system determines in-situ well placement based on mapping of the subsurface. The data processing system can optimize well placement based on two-dimensional (2D) or three-dimensional (3D) subsurface mapping based on proactive planning and interactive data acquisition and analysis.

20 Claims, 9 Drawing Sheets

(56) References Cited

U.S. PATENT DOCUMENTS

| | | | |
|---|---|---|---|
| 2021/0355805 A1* | 11/2021 | Rangarajan | E21B 44/00 |
| 2021/0404313 A1* | 12/2021 | Saidutta | E21B 7/04 |
| 2022/0043179 A1* | 2/2022 | Ghosh | G06N 20/00 |
| 2022/0090481 A1* | 3/2022 | Aljedaani | G06N 3/006 |
| 2022/0253761 A1* | 8/2022 | Jamieson | E21B 44/00 |
| 2022/0260746 A1* | 8/2022 | Al-Malki | G06F 30/12 |
| 2022/0268152 A1* | 8/2022 | Al-AbdulJabbar | E21B 49/087 |
| 2022/0290550 A1 | 9/2022 | Ba et al. | |
| 2022/0316278 A1* | 10/2022 | Pandya | E21B 44/02 |
| 2022/0351037 A1* | 11/2022 | Li | G01N 21/3563 |
| 2023/0266500 A1* | 8/2023 | Soroush | E21B 41/00 |
| | | | 175/50 |
| 2024/0068350 A1* | 2/2024 | Zhang | E21B 7/04 |

OTHER PUBLICATIONS

Sun et al., "Real-time updating method of local geological model based on logging while drilling process," Arabian Journal of Geosciences, Apr. 2021, 14:746, 17 pages.

Turdu et al., "Modeling while drilling," Middle East & Asia Reservoir Review, Jan. 2007, 7 pages.

International Search Report and Written Opinion in International Appln. No. PCT/US2024/055718, mailed on Mar. 3, 2025, 16 pages.

* cited by examiner

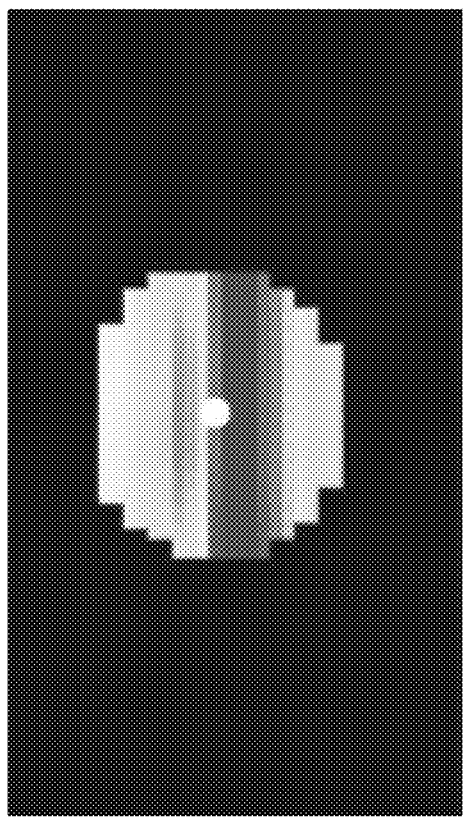
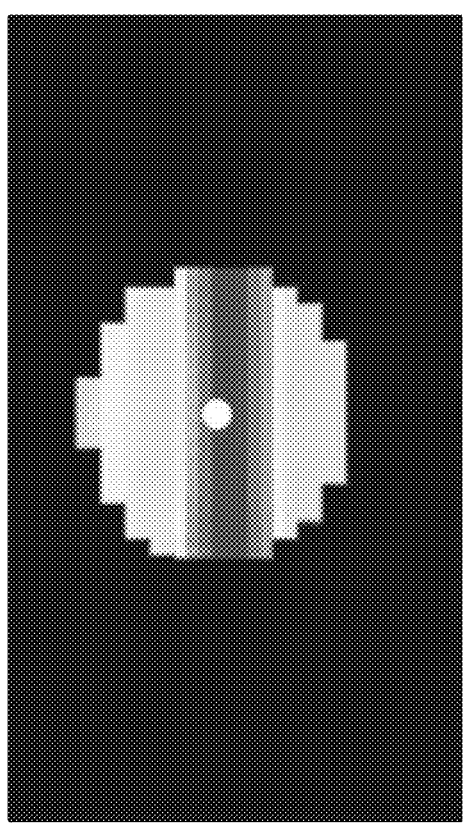
FIG. 3B
FIG. 3A

Pre-modeled well trajectory

Real-time optimized

THREE-DIMENSIONAL RESERVOIR MAPPING FOR DRILLING HYDROCARBON WELLS

TECHNICAL FIELD

This specification relates to control systems. Specifically, this specification describes processes for controlling three-dimensional drilling for one or more hydrocarbon wells based on reservoir mapping and navigation using machine learning with real-time data.

BACKGROUND

Drilling a hydrocarbon well has challenges due to a harsh environment downhole. In addition to the high temperature, high pressure, highly acidic and corrosive environments encountered in deep wells, there are destructive, dynamic conditions such as high torque, shock, and vibration created by the drill bit grinding and penetrating through rock formations. These conditions can make drilling challenging. Logging and directional instruments are used to acquire measurements and provide an accurate representation of the well while drilling over extended periods of time.

SUMMARY

This specification describes systems and methods for planning well paths in a reservoir and controlling drilling of wells within the reservoir. A data processing system determines well placement based on two-dimensional (2D) or three-dimensional (3D) subsurface mapping based on pro-active planning and/or interactive data acquisition and analysis.

The systems and method described in this specification include downhole logging systems and surface sensor systems that enable acquisition of high-end measurements for near real-time data analysis by a controlling system. The systems and methods include augmenting the analysis of these sensor data with machine learning for data quality enhancement of the sensor and data. The enhanced sensor data enables a data processing system to generate a prediction of reservoir properties with a higher confidence (e.g., less uncertainty). The data processing system is configured to determine, based on mapping an optimal in-situ reservoir quality, an optimum well path within preset limits. The data processing system and/or a controller is configured to output commands to a downhole steering system to autonomously execute a steering operation referencing to and reiteratively updating the planned well path.

The data processing system is configured to cause a drill to perform autonomous geo-steering in 3D based on optimal in-situ reservoir quality using real-time or near real-time processing of data received from surface and subsurface sensors. The data processing system can dynamically assign weight factors to drilling parameters and petrophysical measurements in order to solve for lithology, petrophysical properties, and fluid changes. The data processing system is configured to select a modified target path within preset limits that can maximize an optimal reservoir contact and minimize a low reservoir quality or a non-reservoir contact.

The one or more embodiments described in this specification can enable one or more of the following advantages. The data processing system is configured to improve a depth accuracy and grid size of subsurface models. Depending on the available data and the resolution of implemented simulation model, the size and resolution of earth and reservoir models can vary from hundreds of feet to few tens. The depth accuracy is a function of the surface seismic acquisition methodology and data processing which can be also off by few tens of feet. The 3D data mapping processing system can include a resolution up to 2×2×2 feet. The data processing system generates a 3D structural model (called geo-mapping) using 3D data and/or data inversion modeling. The 3D inversion modeling provides superior resolution compared to some earth and reservoir models. When correlating and merging to the models, the data processing system can extract sub-seismic changes and use them to generate a high-definition model that can be used for upscaling with higher accuracy and can pick a target location in the subsurface and adjust a drill/well trajectory. The machine learning model that is part of the data processing system facilitates generation of the high-definition model, Petrophysical Properties Prediction (PPP) and assigning dynamic weight factors.

Embodiments of these systems and methods can include one or more of the following features.

In a general aspect, a method for drilling a well in a subsurface comprises obtaining reservoir data comprising geophysical data, petrophysical data, or drilling data; generating a reference three-dimensional (3D) geo-steering model, the reference geo-steering model comprising a projected well path based on the geophysical data; receiving, from one or more sensors in the well, the one or more sensors being associated with a drilling bit, real-time drilling data, the real-time drilling data including updated geophysical data, updated petrophysical data, or updated drilling data; validating one or more parameter values of the reference model based on the real-time drilling data; generating, based on the validating, an updated 3D geo-steering model and well path in the subsurface for controlling the drilling bit; and sending, to the drilling bit in the well, the updated well path.

In some implementations, the method comprises generating steering instructions based on the updated well path; and controlling azimuthal three-dimensional (3D) steering of the well based on the steering instructions.

In some implementations, the updated well path comprises an in-situ 3D well trajectory within a measurable volume of the one or more sensors with azimuthal (3D) value.

In some implementations, the updated 3D model comprises a micro-scale sub-seismic property change and the direction of change in 3D configurable for improved upscaling.

In some implementations, validating the reference model comprises: determining a discrepancy between the one or more parameter values of the reference model and one or more real-time parameter values generated from the real-time drilling data; updating a dynamic weight associated with at least one parameter value of the one or more parameter values or updating the at least one parameter value of the one or more parameter values; updating the reference model with the updated weight or the updated at least one parameter value, the updated reference model being a new reference to the real-time geo-steering model; and generating, using the real-time geo-steering model, the updated well path that is different from the projected well path of the reference model.

In some implementations, the method comprises generating a visualization of the reference and the updated well path in the subsurface.

In some implementations, validating the one or more parameter values of the reference model based on the real-time drilling data comprises: applying a machine learning model to the real-time data to generate an updated geo-steering model; and comparing, for a specific depth value, the one or more parameter values of the reference model with corresponding respective updated parameter values of the updated geo-steering model.

In an aspect, a system is for drilling a well in a subsurface. The system includes one or more sensors in a well; a drill; and a controller in communication with the one or more sensors and the drill, the controller comprising one or more processors configured to perform operations comprising: obtaining reservoir data comprising geophysical data, petrophysical data, or drilling data; generating a reference three-dimensional (3D) geo-steering model, the reference geo-steering model comprising a projected well path based on the geophysical data; receiving, from the one or more sensors in the well, the one or more sensors being associated with the drill, real-time drilling data, the real-time drilling data including updated geophysical data, updated petrophysical data, or updated drilling data; validating one or more parameter values of the reference model based on the real-time drilling data; generating, based on the validating, an updated 3D geo-steering model and well path in the subsurface for controlling the drilling bit; and sending, to the drill in the well, the updated well path In an aspect, one or more non-transitory computer readable media storing instructions that, when executed by one or more processors, cause the one or more processors to perform operations comprising: obtaining reservoir data comprising geophysical data, petrophysical data, or drilling data; generating a reference three-dimensional (3D) geo-steering model, the reference geo-steering model comprising a projected well path based on the geophysical data; receiving, from one or more sensors in the well, the one or more sensors being associated with a drilling bit, real-time drilling data, the real-time drilling data including updated geophysical data, updated petrophysical data, or updated drilling data; validating one or more parameter values of the reference model based on the real-time drilling data; generating, based on the validating, an updated 3D geo-steering model and well path in the subsurface for controlling the drilling bit; and sending, to the drilling bit in the well, the updated well path.

The details of one or more embodiments are set forth in the accompanying drawings and the description below. Other features and advantages will be apparent from the description and drawings, and from the claims.

BRIEF DESCRIPTION OF THE DRAWINGS

FIGS. 3A-3B are cross-section views illustrating examples of projected well trajectories for holding an azimuth trajectory and increasing a dip angle.

DETAILED DESCRIPTION

Figure 1:
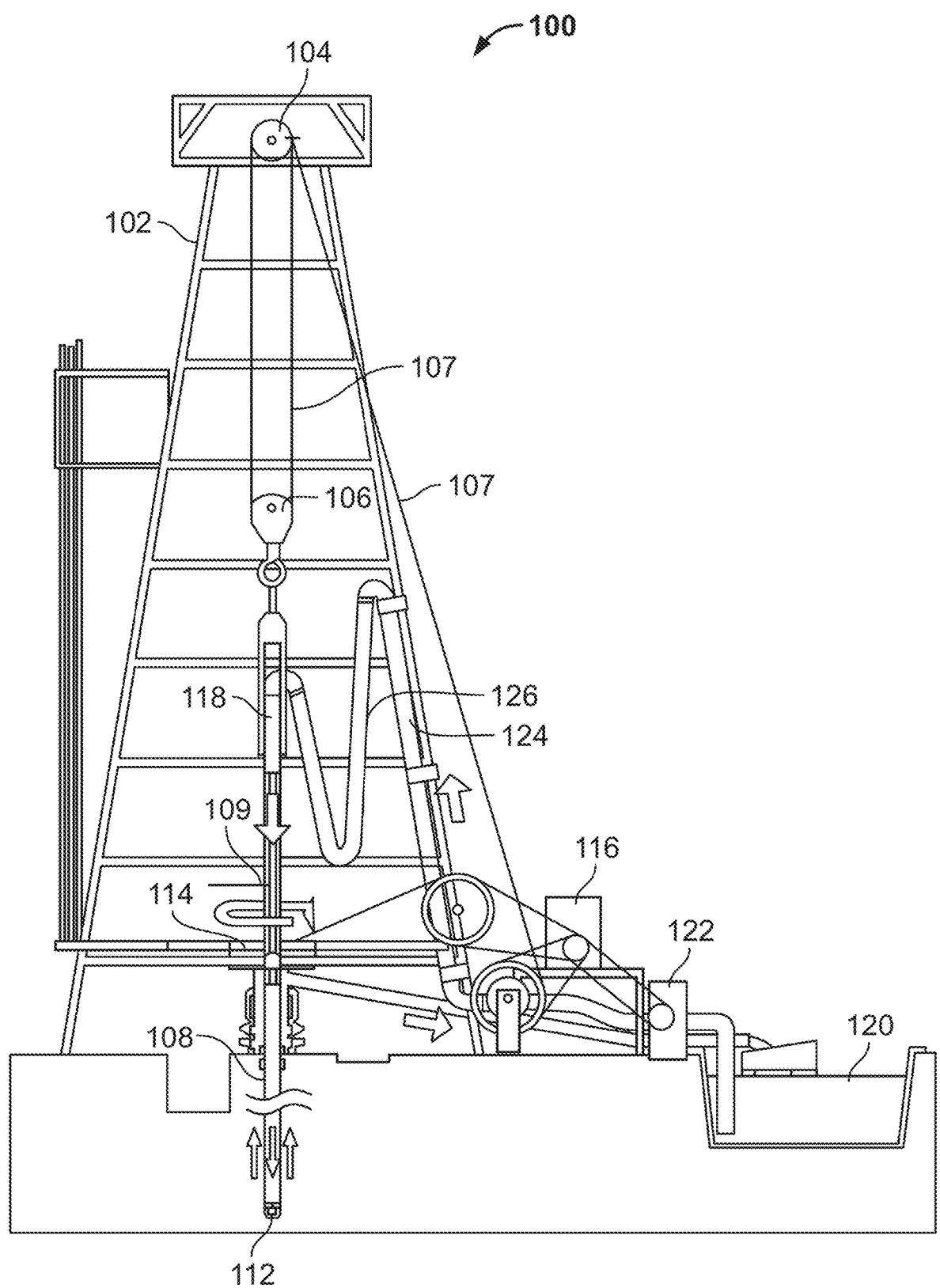
FIG. 1 is an illustration of an example well drilling rig.

The data processing system and methods described in this specification are configured to utilize lithological and reservoir properties to generate an optimal placement in a reservoir as traditionally measured by "net-to-gross" key performance indicators (KPI). This provides improved control relative to a system using either only an interactive 2D pathing with inclination control or a preplanned 3D control including azimuthal and inclination control for well placement planning an execution. The data processing system outputs 3D geo-steering commands based on processing spatial repository data such as geophysical and reservoir 3D models and log measurements such as the use of azimuthal gamma, azimuthal density and/or new generation azimuthal resistivity tools with tilted transmitter(s) and receiver(s) and based on performing 3D resistivity inversion. The data processing system determines a spatial location for a target well path and controls drilling for matching the target path.

The data processing system performs data integration in the preplanning phase. Different sources of data are affected by different factors resulting in less uncertainty. For example, resistivity measurement is affected by the conductivity of the surrounding (lithology, formation fluid(s) and mud) when seismic/acoustic logs are affected by acoustic impedance. The data processing system has a higher level of confidence when each of seismic and resistivity data-processed independently-show agreement regarding a change or event or can integrate the data to resolve and predict other petrophysical properties, the same concept that is used in density-neutron cross plot done by machine learning.

Different resolutions allow for macro and micro grid modelling and therefore upscaling and downscaling. For example, a resolution (cell size) of a seismic inversion model can be +/−10 feet. A reservoir model, depending on how many wells/laterals are used and how far apart they are, can be in the order of 10s or 100s of feet for the resolution. A resolution of resistivity 3D inversion is currently at about +/−5 feet, and can be as low as 2 feet near well-bore Drilling and completion data provide dogleg severity (DLS) and anti-collision limits. For example, if torque and drag or completion deployment simulations indicate potential to encounter issues if a dogleg severity (DLS) is greater than 4 degrees per 100 feet, the data processing system limits the DLS below 4 deg/100 Ft. In another example, for anti-collision, if the simulation shows that the well may intersect with another well within +/−50 feet, the data processing system automatically sets a limit that can be higher or lower than 50 Ft based on the level of uncertainty of the available data.

The data processing system uses earth and reservoir models to provide the pre-job planning basis, optimum bottom hole assembly (BHA), and logging suite requirements. The data processing system earth model includes data such as but not limited to formation tops, thicknesses, formation dip angle and a basic structure map. The reservoir model includes fluid type(s), levels, and free/bound volumes. The pre-modeled well path will be one that targets the zone of interest based on a fluid type, formation layer, drainage volume, and so forth.

The data processing system uses real-time azimuthal measurements and inversions to validate and update pre-job modeling. The result of the real-time 3D geo-mapping provides sub-seismic resolution. The data processing system, by pre-modeling the lithological structure and fluid-filled porosity, has a reference for the expected measurement values. The real-time 3D measurements and inversion confirms or calls for updating in whole or part the data used for pre-modeling.

The data processing system performs real-time autonomous petrophysical analysis and further predicts petrophysical properties facilitating automated control and can prompt a user for updating one or more parameters if there is discrepancy. For example, assuming that the data processing system predicts a high resistivity but receives data indicating lower measured values (or vice versa), the data processing system can autonomously update the input models within specified limits or prompts or alerts users to investigate the source of discrepancy when exceeding these limits. This can include unaccounted changes, for example, a mineralogy change, a fracture, a fluid change, and so forth. The user can revise inputs to the model accordingly to resolve the discrepancy.

The data processing system uses augmented reality reservoir modeling to provide a look-around and look-ahead approach for decision making. The augmented reality of the data processing system enables visualization of the pre-modeled downhole surroundings including earth and reservoir models. The data processing system updates this visualization continuously using autonomously processed real-time measured data. The data used can include repository data such as models, geological data such as mineralogy, thickness, structural dip, and reservoir fluids data, such as fluid type, properties, and bond/free fluid data.

The data processing system includes a geo-steering automation engine that provides a faster response time and improved efficiency. The improvement depends on the complexity of a geo-steering scenario. The exact level of efficiency improvement depends on a competency and consistency of the directional driller and geo-steering users. Generally speaking, automation outperforms manual operation in terms of consistency and response time. The geo-steering based on reservoir quality improves return on investment due to higher well production, increased drilling efficiency, and reduced emission from the drilling process.

FIG. 1 shows an illustration of an example well drilling rig 100. A derrick 102 provides a structure that supports the drilling equipment. A crown block 104 mounted at the top of the derrick 102, a traveling block 106, and a drill line 107 connected between them move the drill string 108 vertically. The drill string 108 includes a plurality of sections of drill pipe 110, a kelly bar 109, and a drill bit 112 or other bottom hole assembly. The kelly bar 109 is a square section of pipe that interfaces with a rotary table 114 to transfer torque from a motor or engine 116 to the drill string 108. A swivel 118 is connected between the top of the drill string 108 and the traveling block 106. The swivel 118 allows the drill string 108 to turn without turning the traveling block 106.

A drilling fluid or mud is used to remove cuttings from the well during drilling. A mud tank 120 holds the mud. A mud pump 122 pumps the mud from the mud tank 120 to the swivel 118 via a rigid standpipe 124 and a flexible hose 126. The mud is pumped through the center of the drill string 108 to the bottom of the hole through the drill bit 112. The mud returns to the surface carrying the cuttings through the annulus formed between the wall of the well and the outside of the drill string 108. The mud returns to the mud tank 120 via a flow line 128 where the cuttings are filtered, and the mud recirculates through the system.

As the drill string 108 rotates, the drill bit 112 engages with and cuts the bottom of the hole penetrating a subsurface formation. The rate at which the drill bit penetrates the formation is called the rate of penetration (ROP). The weight on the drill bit (WOB) is controlled by the amount of tension applied to the drill line 107 and can affect the ROP.

The motor or engine 116 that turns the drill bit and raises and lowers the drill string, the mud pump 122 and other equipment located on or near the drilling rig such as generators, burn fuel and emit carbon dioxide, $CO_2$. The amount of $CO_2$ emitted can be proportional to the fuel consumed by the drilling rig. Fuel consumption and $CO_2$ emissions can be reduced by optimizing various drilling parameters.

Figure 2:
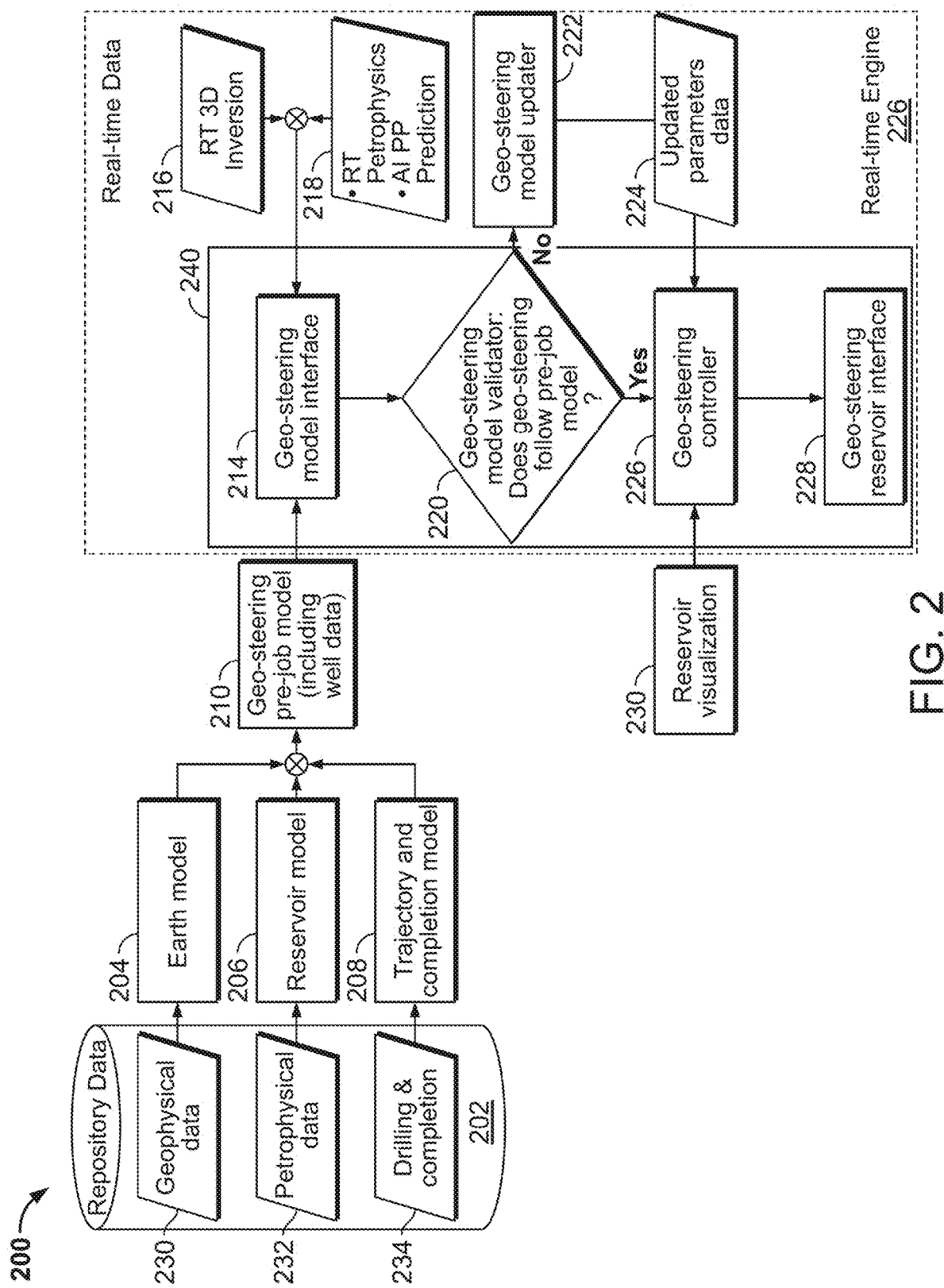
FIG. 2 shows a block diagram illustrating an example system for three-dimensional reservoir mapping for drilling hydrocarbon wells.

FIG. 2 shows a block diagram illustrating an example data processing system 200 for three-dimensional reservoir mapping for drilling hydrocarbon wells. The data processing system. The data processing system 200 is configured to process well and reservoir data and update a well path plan in real-time or near real-time. In some implementations, the data processing system 200 is configured to generate control signals and send the control signals to a drilling rig (e.g., well drilling rig 100 of FIG. 1). The control signals can cause the drilling rig to update a path for drilling the well. The well path can include horizontal well paths through the subsurface.

The data processing system 200 includes a repository 202 for storing well and reservoir data. The repository 202 is configured to store geophysical data 230, petrophysical data 232, and drilling and completion data 234. The geophysical data 230 can include as seismic data including processed seismic traces, core/cuttings descriptions, offset well logs data, and so forth. The well logs data can include porosity data, facies estimates, resistivity data, and so forth.

The geophysical data 230 are processed by an earth model 204. The earth model includes a sub-surface earth modeling platform that generates stratigraphic models of the subsurface. For example, the earth model can include a 3D model facies in the subsurface in addition to fluid flow or fluid locations in the subsurface.

The petrophysical data 232 includes wireline logs, LWD logs and mud logs. Petrophysical data can include mud logs which are generated from analysis of drilling fluid gases and formation cuttings for oil and gas wells and correlation of these data to a depth of the bit and therefore the formations from which they came. The mud logs can represent a lithology of the subsurface. The petrophysical data include analysis of gas produced at a well. The petrophysical data include X-ray Fluorescence (XRF) and X-ray Diffraction (XRD) data. XRD identifies and measures the presence and amounts of minerals and their species and phases at the well. XRF provides a representation of a chemical composition of rock samples at the wells. The petrophysical data can include electric wireline (WL) data and logging while drilling (LWD) data such as resistivity, density, neutron, acoustic, nuclear magnetic resonance (NMR) measurements, imaging data and formation pressure and fluid data. The reservoir simulation model 206 determines values for parameters such as a relative mobility, a saturation height function, and geo-mechanical properties at the reservoir.

The drilling and completion data 234 include data from sensors in the drilling rig (e.g., drilling rig 100). The drilling data can include weight on bit (WoB) data, a rate of penetration (RoP), mud properties (type, weight, salinity, formulation, etc.), and equivalent circulating density (ECD). The completion data can include completion type (OH/CH), fracture pressure, maximum dogleg severity (for running completion), and so forth. The drilling and completion data 234 are input into a trajectory and completion model 208 that defines constraints for the well path for the drilled well and generates a safe and practical target path for drilling the well through the subsurface.

The earth model 204, the reservoir model 206, and the trajectory and completion model 208 output parameter values that are combined for processing by the geo-steering pre-model 210. The geo-steering pre-job modeling combines the earth, reservoir and well trajectory models which are prepared using repository data from offset wells of the well to be drilled. The data processing system 200 receives real-time data relevant to each of the three models and processes the data autonomously following case-specific processing workflows to identify lithology and compute rock and fluid properties. These models are in 2D or 3D based on the deployed tools or technologies of the models. The workflows of the geo-steering model 210 include autonomous petrophysics outputting mineralogy and fluid saturation data, an interactive earth and reservoir model update, a target path, and a target trajectory update The data processing system 200 includes a real-time engine 226. The real-time engine 226 of the data processing system 200 initialize a geo-steering model 240 and compares with the pre-job model 210. The real-time engine 226 updates the geo-steering model 240 as additional data are acquired during drilling. The real-time engine 226 interactively updates the pre-job model to steer the drilling.

The geo-steering model 240 includes a geo-steering model interface 214. The interface 214 is configured to receive the pre-job model 210 and initialize the geo-steering model 240. The interface 214 receives real-time data as the well is drilled. The real-time data is used by the real-time engine 226 to update the geo-steering model as subsequently described.

The interface 214 receives several sets of real-time data. The interface is configured to receive real-time azimuthal measurements and 3D inversion data 216. The 3D inversion data is generated from measured components of azimuthal resistivity tools. The 3D inversion includes a reconstructed resistivity bodies from modeled resistivity in 3D. The 3D inversion supports understanding the geological structure and identifying fluid presence/change as the drilling proceeds in the subsurface. Resolving the structure (geo-mapping) and fluid provide the basis for picking the target and adjusting the trajectory. For example, in a case of sand channels and/or patchy reservoirs, the data processing system 200 can steer the well path to the right or left in addition to the traditional up or down direction to follow an optimal reservoir quality.

The real-time data include real-time petrophysical measurements data and petrophysical properties prediction (PPP) processed data. The PPP data are generated based on the real-time petrophysical data analysis. The PPP data are a second layer of processing that results from a background advanced computation of the output from autonomous petrophysics (being the first layer) and performs analysis and correlations to forward-model (project) and predict properties along the planned well trajectory. The predicted properties are used in the reference and real-time models and to assign weight factors for decision making by the geo-steering model.

The geo-steering model 240 is configured to steer drilling of the well to the optimal well path in the subsurface. The inputs to the geo-steering model include the pre-modeled geological grid (earth model), pre-modeled porosity and saturation (reservoir model), and pre-modeled well trajectory from the pre-job model 210 described previously. The 3D geo-steering model 240 also receives real-time azimuthal data such as resistivity 3D inversion & anisotropy analysis data 216, real-time petrophysics analysis data 218, and real-time drilling parameters.

The geo-steering model generates output data for steering the drilling of the well. The output data include continuous 3D coordinates determination of the projected optimal reservoir quality. The output data is sent to an automation platform to optimize the well trajectory maximizing contact with an optimal reservoir quality. The automation platform interacts with a directional drilling platform. These output data are constrained by a maximum dogleg severity (DLS) computed value and a no-go computed depth, which may indicate a free water level, an anti-collision region, and so forth.

The geo-steering model includes a determination of a mismatch between a reference (pre-job) model and a real-time model. The data processing system 200 determines the magnitude by correlating coordinates and computing value differences of the models in 3D. The data processing system 200 is configured to autonomously update the earth and reservoir models in real-time as more data are acquired during drilling. This output required update values are constrained by a seismic acquisition and processing resolution.

There are many geo-steering scenarios depending on reservoir structure and fluid distribution complexity. The inputs in the geo-steering model 240 are determined by the data processing system 200 based on a specific scenario for the drilling operations. For example, in a simple (1D) drilling environment, the data processing system 200 can use a single input such as resistivity, porosity, or gamma ray data. In this example, the geo-steering model is configured to compare value to value (log measurement and TVD depth). In a subsurface environment of moderate complexity, such as laminated clastic reservoirs including sand and shale sequences (2D) and/or lateral variations (3D), more of the previously described inputs can be included. The geo-steering model 240 compares more sophisticated values as previously described. For example, Rv/Rh (2D) and/or azimuthal density, 3D resistivity inversion can be input data 216 or the real-time petrophysical analysis 218. In a complex subsurface environment that includes injectites, turbidites, and/or compartmentalized and heterogenous carbonate reservoirs, a 3D azimuthal measurement (including resistivity, density sectors, etc.) and NMR can be included. The geo-steering model generates a histogram of the inverted resistivity data and performs rock and fluid typing and consequently picks an optimal spot (e.g., 3D coordinates) within the limits of the specified constraints.

The real-time engine 226 is configured to update the geo-steering model 240 using the real-time data 216, 218. The geo-steering model 240 can perform these updates based on machine learning models. The machine learning models update the weight factors for various parameters and can also update the selection of the parameters based on the real-time data 216, 218 received and based on the computed discrepancies. The geo-steering model 240 compares, at the geo-steering model validator 220, the pre-job model 210 (or current model) parameter values to the parameter values measured or calculated based on the real-time data 216, 218 received. If the pre-job model parameter values and measured or calculated parameter values at the drill bit agree, the geo-steering model 240 generates steering commands using a geo-steering controller 226. The geo-steering controller 226 generates commands based on the geo-steering model parameter values and calculated trajectory. If the pre-job model parameter values and measured or calculated parameter values at the drill bit do not agree, the geo-steering model 240 is updated at a geo-steering model updater 222 to generate updated parameters data 224.

The geo-steering model 240 can be updated based on several factors. For example, the azimuthal measurements and 3D modeled data 216 are used to update the geo-steering model 240. The geo-steering model 240 uses the azimuthal measurements to detect lateral variations and optimize well trajectory in the optimal reservoir quality. FIGS. 3A-5C show examples of 3D resistivity inversion data (e.g., cross sections) and illustrate how these data impact the decision making to turn the well path during drilling. Having this measurement as close to the bit as possible results in a faster response and consequently a less tortuous well trajectory. This is achieved using LWD tools with closer to the bit sensors. The new generation of LWD azimuthal resistivity has a high-resolution shallow measurement less than 10 Ft behind the bit which can be inverted in 3D. This data is acquired in real-time and compared to the pre-modeled well trajectory for optimization.

The geo-steering model 240 can be updated based on other data found during drilling. For example, when solving for mineralogy in real-time, the data processing system 200 can determine that a formation top is shallower or deeper than expected. The measured changes are fed back into earth model 204 and reservoir model 206, interactively updating the reference pre-job reservoir thickness, fluid column saturation and therefore remodeling and recomputing new target and well trajectory 208 in a continuous loop.

The geo-steering model updater 222 updates the geo-steering model 240 parameters based on real-time measurement and computation, which can examine and/or validate dependency or uncertainty in the model. For example, an ROP drop may flag lithology or density change (e.g. same lithology but lower porosity). The density change can be verified by measurement when a sensor tool (such as gamma ray, density, etc.) reaches the bit depth. Similarly, a change in mud gas can indicate fluid or mobility change which can be verified by resistivity or NMR.

When a parameter changes in accordance with the pre-job model 210, the geo-steering model 240 validates a level of confidence. The level of confidence increases as more measurements are obtained that are confirming the pre-job model 210 parameter values. When a parameter changes unexpectedly or leads/lags an anticipated change, the real-time engine is configured to flag uncertainty and update a weight factor. For example, a change in resistivity can be attributed to crossing layers and not fluid change is flagged.

Parameters are assigned a dynamic weight factor representing how well the parameter values align with the pre-model 210 and other real-time data 216, 218 measurements. The geo-steering model updater 222 can add secondary or predicted parameters, such as unconfined compressive strength (UCS), if there is a good correlation with real-time measurements. The geo-steering model updater 222 does not drop inconsistent parameters from the model but rather flags them to investigate a reason for inconsistency. For example, a measurement can be affected by a borehole condition such as an enlargement, a spiral, or a breakout, rather than by a rock or fluid change.

A geo-steering interface 228 is configured to send commands generated by the geo-steering controller 226 to a drill of the drilling rig. The geo-steering interface 228 is configured to the drilling rig an optimized well path or drilling trajectory through the reservoir to optimize production or avoid drilling issues as previously described.

The data processing system 200 generates a reservoir visualization 230. The visualization 230 includes a planned well path through the subsurface. In some implementations, the visualization can overlay actual visual data from the well. The data processing system 200 can generate the visualization 230 for both the reference model 210 and real-time updated geo-steering model 240.

Each of 2D and 3D modeling of geophysical data are used for building global structural maps used by reservoir engineers to develop field development plans. The depth accuracy and grid size are the primary limitations of these models. Depending on the available data and the resolution of implemented simulation model, the size and resolution of earth and reservoir models can vary from hundreds of feet to few tens of feet. The depth accuracy is a function of the surface seismic acquisition and processing which can be also off by few tens of feet. As previously described, the model 240 can have a resolution of 2×2×2 feet for generating 3D structural model (geo-mapping) using 3D modeling which provides superior resolution compared to the earth model 204 and reservoir model 206. When correlating and merging to the models, the geo-steering model 240 can provide indication of "sub-seismic" changes and use the indication to generate a high definition model that can be used with high accuracy to pick the optimal target and adjust the trajectory. A machine learning function of the geo-steering model 240 is to facilitate that overlay in addition to predicting properties and assigning weight factors, and so forth.

The interactive 3D geo-steering model 240 addresses heterogeneity challenges implementing 3D modeling from azimuthal data, such as azimuthal density and 3D resistivity inversion which became available with the development of tilted transmitter and receiver generation of azimuthal resistivity tools. The 3D modeling has multiple advantages depending on the model selection and parameters used. The geo-steering model has a varying degree of uncertainty due to the physics of the measurement, tool accuracy (e.g., signal to noise ratio) and the model 204, 206, and 208 accuracies.

FIGS. 3A-3B are cross-section views of 3D modeling illustrating examples of projected well trajectories for holding an azimuth trajectory and increasing a dip angle. In image 300, the projected well trajectory indicates that the azimuth angle of the well path should be held steady. Image 310 of FIG. 3B indicates that the dip angle can be increased.

Figure 4A:
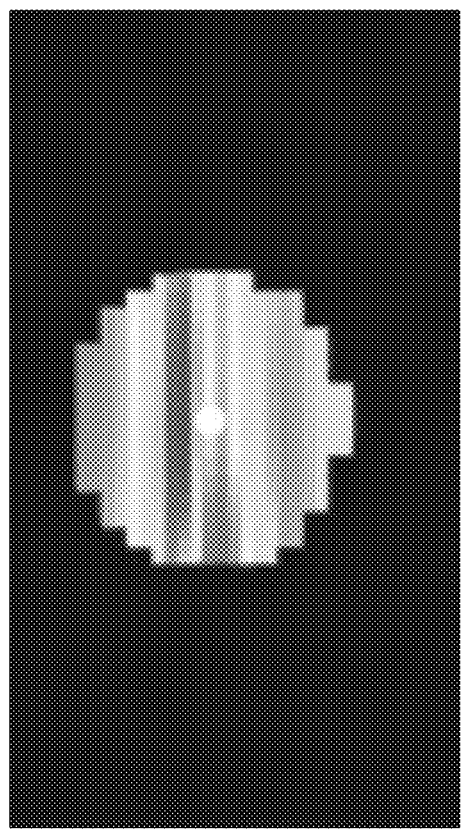
FIGS. 4A-4B are cross-section views illustrating examples of projected well trajectories for steering downward and leftward.
Figure 4B:
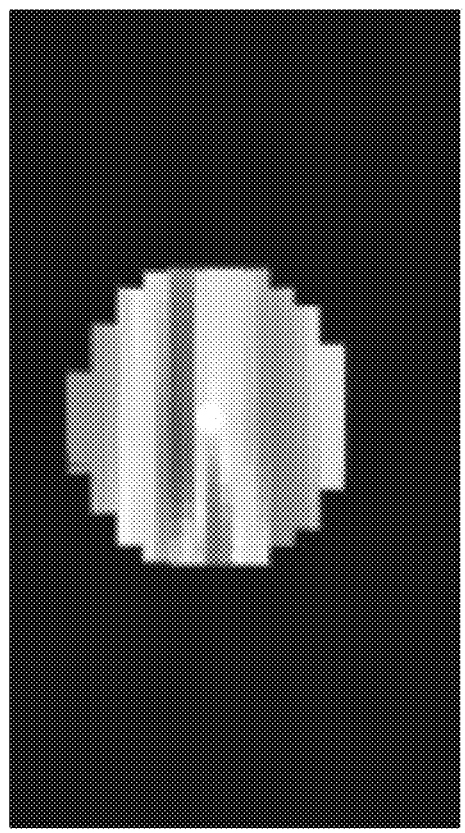

FIGS. 4A-4B are cross-section views illustrating examples of projected well trajectories for steering downward and leftward. Images 400, 410 together indicate that the steering should be down and to the left of the present trajectory.

Figure 5C:
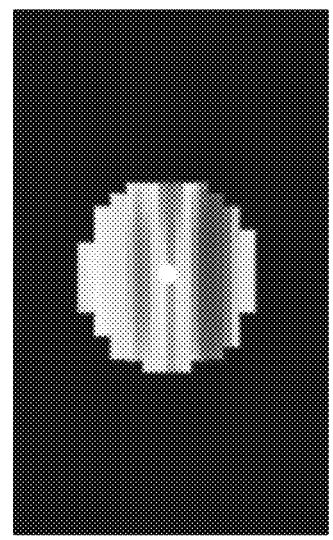
FIGS. 5A-5C are cross-section views illustrating examples of projected well trajectories for steering rightward and upward.
Figure 5B:
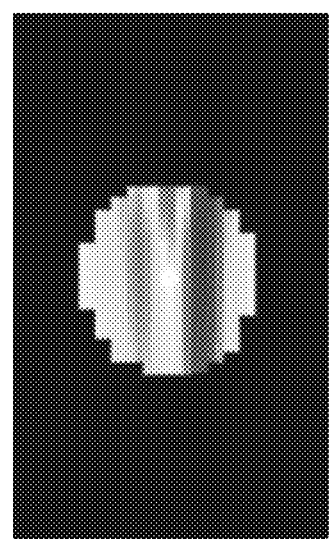
Figure 5A:
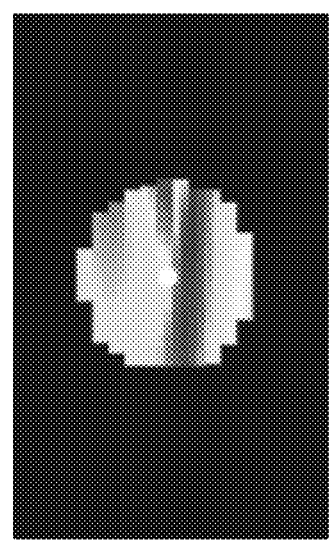

FIGS. 5A-5C are cross-section views illustrating examples of projected well trajectories for steering rightward and upward. Images 500, 510, and 520 show that the drill is steering to the right and should steer upward.

Figure 6A:
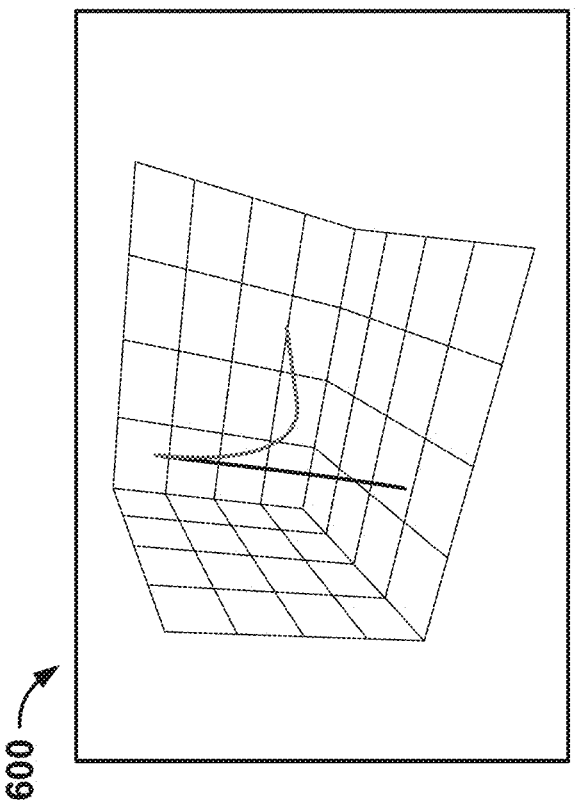
FIG. 6A shows a diagram illustrating a projected well trajectory in 3D space.
Figure 6B:
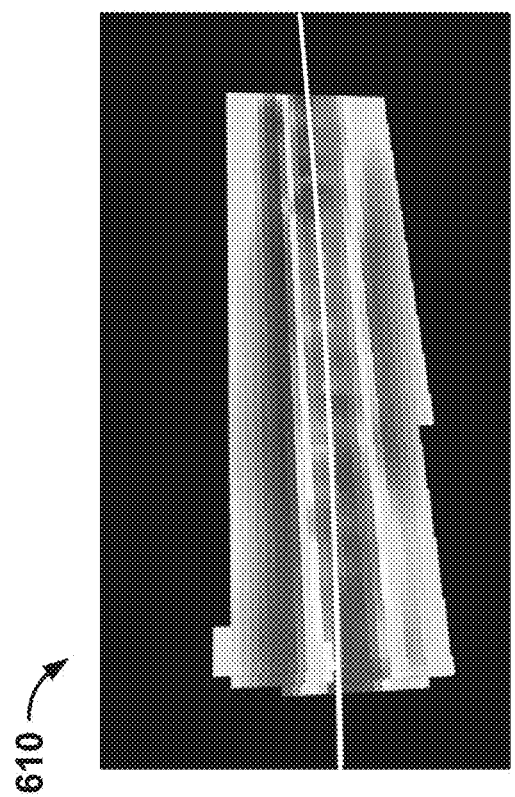
FIG. 6B shows a diagram illustrating a real-time optimized well trajectory in 3D space.

FIG. 6A shows a diagram illustrating a projected well trajectory 600 in 3D space. FIG. 6B shows a diagram illustrating a real-time optimized well trajectory in 3D space. The data processing pre-job modeling system (e.g., data processing system 200 of FIG. 2) is configured to predict a path for a given distance in advance of the drill bit to influence the well path. There can be a latency between a path change decision and changing the path at the bit depending on the real-time modeling point. The geo-steering model 240 can generate a path for a few hundred feet ahead of the bit for some scenarios, the distance will vary based on the available data, complexity of subsurface conditions and the relative angle between well path and formation dip.

Look-ahead in vertical and deviated wells can be achieved using single measurement approach, e.g., a boundary with enough resistivity or acoustic impedance contrast can be detected with reasonable accuracy and a projected intersection depth (assuming no sudden change in formation dip) ahead of the bit can be calculated.

Look-ahead is complex for HA/HZ wells with a level of heterogeneity. Using close-to-the-bit azimuthal resistivity (about 10 feet behind the bit), the data processing system 200 can invert at the sensor with high confidence.

For HA/HZ look-ahead, a multi-input approach comingling measurement(s) and/or models should be used, the distance ahead of the bit that can be reliably predicted is impacted by the accuracy and the lowest resolution of all inputs. The level of uncertainty within the pre-model can be up to tens of feet which can be addressed with real-time model updater (222)

Figure 7:
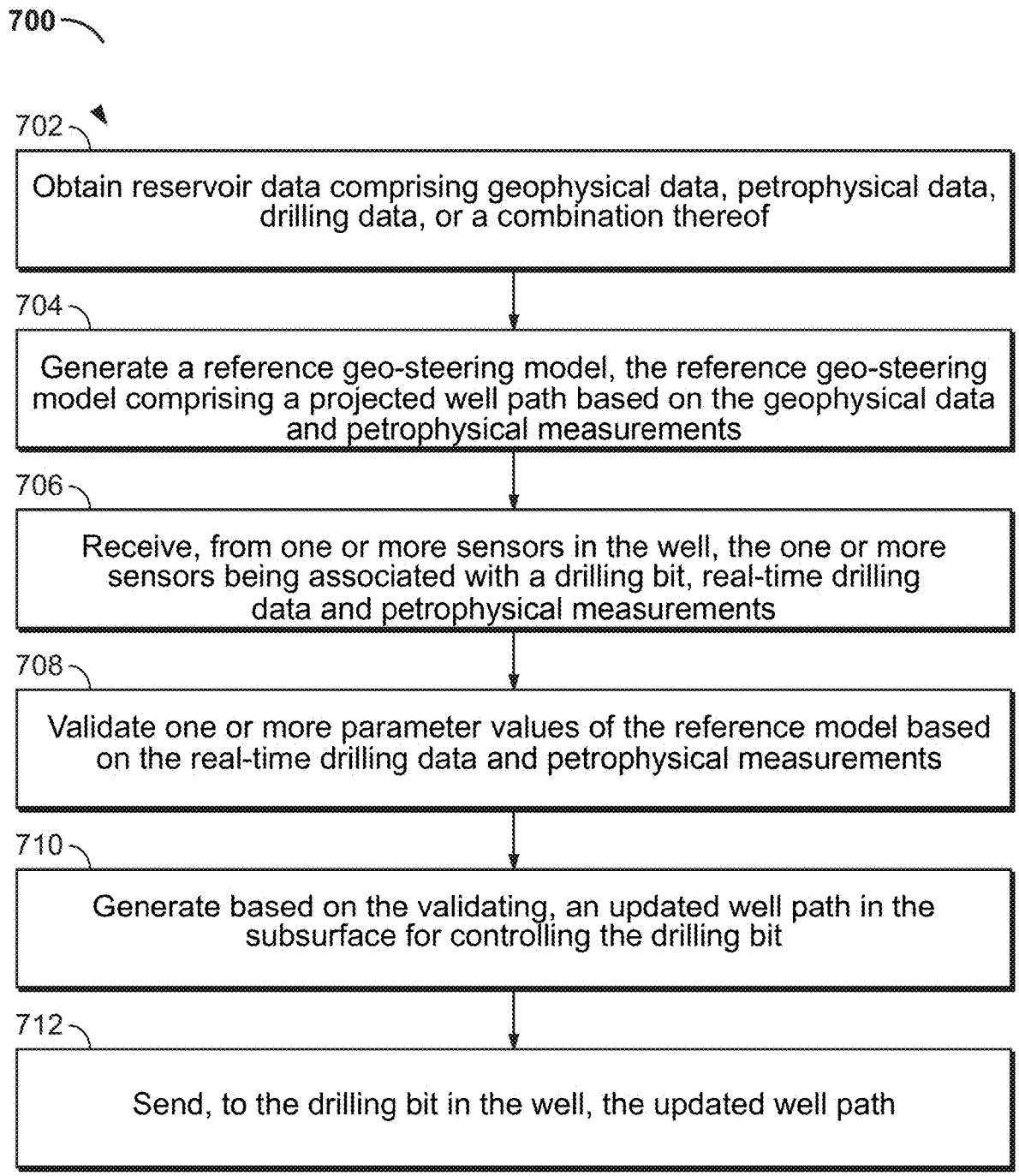
FIG. 7 shows a block diagram illustrating an example process for three-dimensional reservoir mapping for drilling hydrocarbon wells.

FIG. 7 shows an example process 700 for controlling hydrocarbon production in one or more wells, as described herein. In some implementations, the process 700 is performed by a data processing system (such as data processing system 200 of FIG. 2) including one or more processors.

The process 700 includes obtaining (702) reservoir data comprising geophysical data, petrophysical data, or drilling data. The process 700 includes generating (704) a reference three-dimensional (3D) geo-steering model, the reference geo-steering model comprising a projected well path based on the geophysical data. The process 700 includes receiving (706), from one or more sensors in the well, the one or more sensors being associated with a drilling bit, real-time drilling data, the real-time drilling data including updated geophysical data, updated petrophysical data, or updated drilling data. The process 700 includes validating (708) one or more parameter values of the reference model based on the real-time drilling data. The process 700 includes generating (710), based on the validating, an updated 3D geo-steering model and well path in the subsurface for controlling the drilling bit. The process 700 includes sending (712), to the drilling bit in the well, the updated well path.

In some implementations, the process 700 includes generating steering instructions based on the updated well path; and controlling azimuthal three-dimensional (3D) steering of the well based on the steering instructions.

In some implementations, the updated well path comprises an in-situ 3D well trajectory within a measurable volume of the one or more sensors with azimuthal (3D) value.

In some implementations, the updated 3D model comprises a micro-scale sub-seismic property change and the direction of change in 3D configurable for improved upscaling.

In some implementations, validating the reference model includes determining a discrepancy between the one or more parameter values of the reference model and one or more real-time parameter values generated from the real-time drilling data; updating a dynamic weight associated with at least one parameter value of the one or more parameter values or updating the at least one parameter value of the one or more parameter values; updating the reference model with the updated weight or the updated at least one parameter value, the updated reference model being a new reference to the real-time geo-steering model; and generating, using the real-time geo-steering model, the updated well path that is different from the projected well path of the reference model.

In some implementations, the process 700 includes generating a visualization of the reference and the updated well path in the subsurface.

Figure 8:
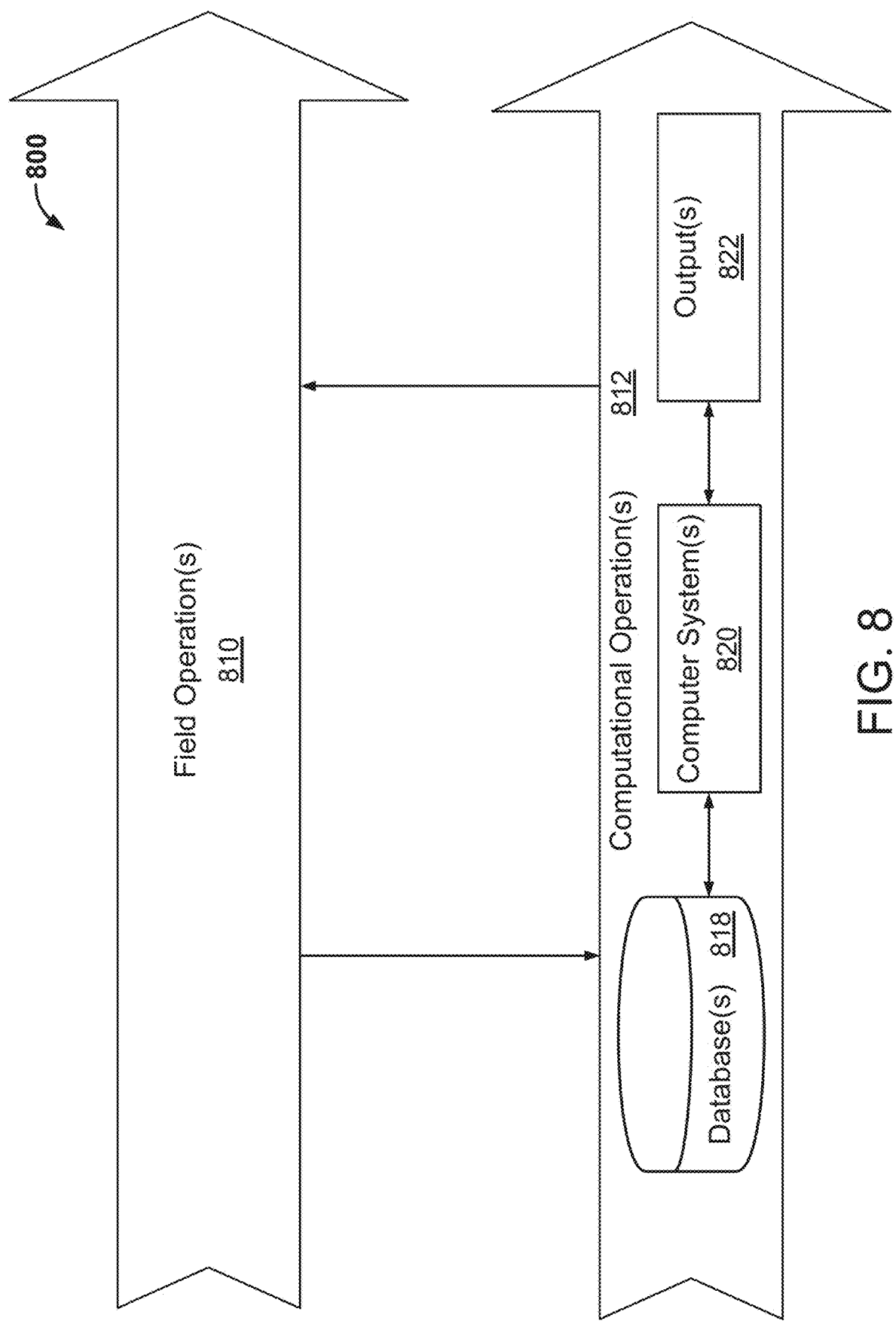
FIG. 8 illustrates hydrocarbon production operations.

In some implementations, validating the one or more parameter values of the reference model based on the real-time drilling data includes applying a machine learning model to the real-time data to generate an updated geo-steering model; and comparing, for a specific depth value, the one or more parameter values of the reference model with corresponding respective updated parameter values of the updated geo-steering model FIG. 8 illustrates hydrocarbon production operations 800 that include both one or more field operations 810 and one or more computational operations 812, which exchange information and control exploration to produce hydrocarbons. In some implementations, outputs of techniques of the present disclosure (e.g., the method 300) can be performed before, during, or in combination with the hydrocarbon production operations 800, specifically, for example, either as field operations 810 or computational operations 812, or both. For example, the processes 300, 320 collect data during field operations, processes the data in computational operations, and can determine locations to perform additional field operations.

Examples of field operations 810 include forming/drilling a wellbore, hydraulic fracturing, producing through the wellbore, injecting fluids (such as water) through the wellbore, to name a few. In some implementations, methods of the present disclosure can trigger or control the field operations 810. For example, the methods of the present disclosure can generate data from hardware/software including sensors and physical data gathering equipment (e.g., seismic sensors, well logging tools, flow meters, and temperature and pressure sensors). The methods of the present disclosure can include transmitting the data from the hardware/software to the field operations 810 and responsively triggering the field operations 810 including, for example, generating plans and signals that provide feedback to and control physical components of the field operations 810. Alternatively, or in addition, the field operations 810 can trigger the methods of the present disclosure. For example, implementing physical components (including, for example, hardware, such as sensors) deployed in the field operations 810 can generate plans and signals that can be provided as input or feedback (or both) to the methods of the present disclosure.

Examples of computational operations 812 include one or more computer systems 820 that include one or more processors and computer-readable media (e.g., non-transitory computer-readable media) operatively coupled to the one or more processors to execute computer operations to perform the methods of the present disclosure. The computational operations 812 can be implemented using one or more databases 818, which store data received from the field operations 810 and/or generated internally within the computational operations 812 (e.g., by implementing the methods of the present disclosure) or both. For example, the one or more computer systems 820 process inputs from the field operations 810 to assess conditions in the physical world, the outputs of which are stored in the databases 818. For example, seismic sensors of the field operations 810 can be used to perform a seismic survey to map subterranean features, such as facies and faults. In performing a seismic survey, seismic sources (e.g., seismic vibrators or explosions) generate seismic waves that propagate in the earth and seismic receivers (e.g., geophones) measure reflections generated as the seismic waves interact with boundaries between layers of a subsurface formation. The source and received signals are provided to the computational operations 812 where they are stored in the databases 818 and analyzed by the one or more computer systems 820.

In some implementations, one or more outputs 822 generated by the one or more computer systems 820 can be provided as feedback/input to the field operations 810 (either as direct input or stored in the databases 818). The field operations 810 can use the feedback/input to control physical components used to perform the field operations 810 in the real world.

For example, the computational operations 812 can process the seismic data to generate three-dimensional (3D) maps of the subsurface formation. The computational operations 812 can use these 3D maps to provide plans for locating and drilling exploratory wells. In some operations, the exploratory wells are drilled using logging-while-drilling (LWD) techniques which incorporate logging tools into the drill string. LWD techniques can enable the computational operations 812 to process new information about the formation and control the drilling to adjust to the observed conditions in real-time.

The one or more computer systems 820 can update the 3D maps of the subsurface formation as information from one exploration well is received and the computational operations 812 can adjust the location of the next exploration well based on the updated 3D maps. Similarly, the data received from production operations can be used by the computational operations 812 to control components of the production operations. For example, production well and pipeline data can be analyzed to predict slugging in pipelines leading to a refinery and the computational operations 812 can control machine operated valves upstream of the refinery to reduce the likelihood of plant disruptions that run the risk of taking the plant offline.

In some implementations of the computational operations 812, customized user interfaces can present intermediate or final results of the above-described processes to a user. Information can be presented in one or more textual, tabular, or graphical formats, such as through a dashboard. The information can be presented at one or more on-site locations (such as at an oil well or other facility), on the Internet (such as on a webpage), on a mobile application (or app), or at a central processing facility.

The presented information can include feedback, such as changes in parameters or processing inputs, that the user can select to improve a production environment, such as in the exploration, production, and/or testing of petrochemical processes or facilities. For example, the feedback can include parameters that, when selected by the user, can cause a change to, or an improvement in, drilling parameters (including drill bit speed and direction) or overall production of a gas or oil well. The feedback, when implemented by the user, can improve the speed and accuracy of calculations, streamline processes, improve models, and solve problems related to efficiency, performance, safety, reliability, costs, downtime, and the need for human interaction.

In some implementations, the feedback can be implemented in real-time, such as to provide an immediate or near-immediate change in operations or in a model. The term real-time (or similar terms as understood by one of ordinary skill in the art) means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second(s), or less than 8 s. While the requested data need not be displayed (or initiated for display) instantaneously, it is displayed (or initiated for display) without any intentional delay, accounting for processing limitations of a described computing system and time required to, for example, gather, accurately measure, analyze, process, store, or transmit the data.

Events can include readings or measurements captured by downhole equipment such as sensors, pumps, bottom hole assemblies, or other equipment. The readings or measurements can be analyzed at the surface, such as by using applications that can include modeling applications and machine learning. The analysis can be used to generate changes to settings of downhole equipment, such as drilling equipment. In some implementations, values of parameters or other variables that are determined can be used automatically (such as through using rules) to implement changes in oil or gas well exploration, production/drilling, or testing. For example, outputs of the present disclosure can be used as inputs to other equipment and/or systems at a facility. This can be especially useful for systems or various pieces of equipment that are located several meters or several miles apart or are in different countries or other jurisdictions.

Figure 9:
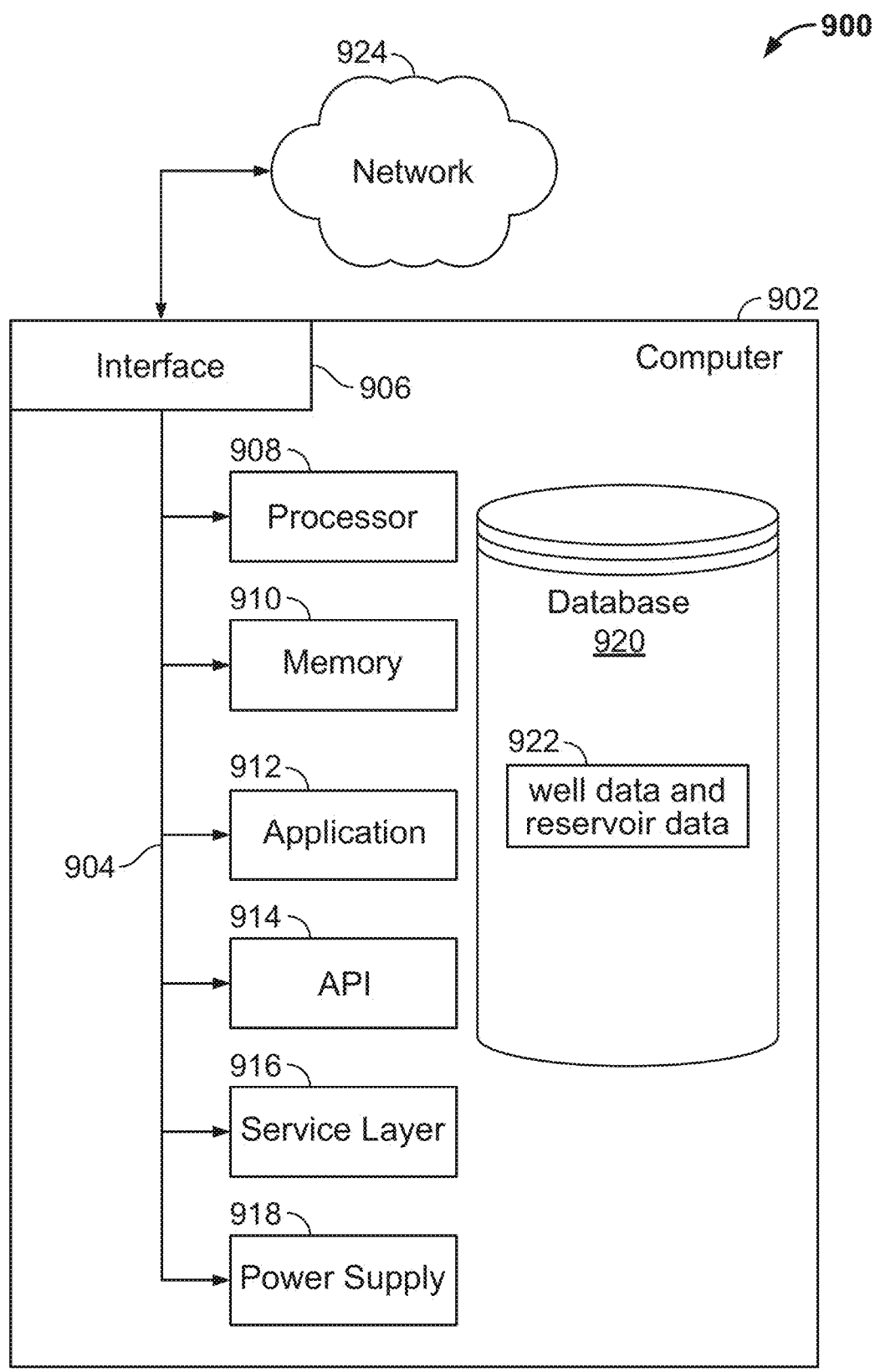
FIG. 9 is a diagram of an example computing system.

FIG. 9 is a block diagram of an example computer system 900 used to provide computational functionalities associated with described algorithms, methods, functions, processes, flows, and procedures described in the present disclosure, according to some implementations of the present disclosure. The illustrated computer 902 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 902 can include input devices such as keypads, keyboards, and touch screens that can accept user information. Also, the computer 902 can include output devices that can convey information associated with the operation of the computer 902. The information can include digital data, visual data, audio information, or a combination of information. The information can be presented in a graphical user interface (UI) (or GUI).

The computer 902 can serve in a role as a client, a network component, a server, a database, a persistency, or components of a computer system for performing the subject matter described in the present disclosure. The illustrated computer 902 is communicably coupled with a network 924. In some implementations, one or more components of the computer 902 can be configured to operate within different environments, including cloud-computing-based environments, local environments, global environments, and combinations of environments.

At a high level, the computer 902 is an electronic computing device operable to receive, transmit, process, store, and manage data and information associated with the described subject matter. According to some implementations, the computer 902 can also include, or be communicably coupled with, an application server, an email server, a web server, a caching server, a streaming data server, or a combination of servers.

The computer 902 can receive requests over network 924 from a client application (for example, executing on another computer 902). The computer 902 can respond to the received requests by processing the received requests using software applications. Requests can also be sent to the computer 902 from internal users (for example, from a command console), external (or third) parties, automated applications, entities, individuals, systems, and computers.

Each of the components of the computer 902 can communicate using a system bus 904. In some implementations, any or all of the components of the computer 902, including hardware or software components, can interface with each other or the interface 906 (or a combination of both), over the system bus 904. Interfaces can use an application programming interface (API) 914, a service layer 916, or a combination of the API 914 and service layer 916. The API 914 can include specifications for routines, data structures, and object classes. The API 914 can be either computer-language independent or dependent. The API 914 can refer to a complete interface, a single function, or a set of APIs.

The service layer 916 can provide software services to the computer 902 and other components (whether illustrated or not) that are communicably coupled to the computer 902. The functionality of the computer 902 can be accessible for all service consumers using this service layer. Software services, such as those provided by the service layer 916, can provide reusable, defined functionalities through a defined interface. For example, the interface can be software written in JAVA, C++, or a language providing data in extensible markup language (XML) format. While illustrated as an integrated component of the computer 902, in alternative implementations, the API 914 or the service layer 916 can be stand-alone components in relation to other components of the computer 902 and other components communicably coupled to the computer 902. Moreover, any or all parts of the API 914 or the service layer 916 can be implemented as child or sub-modules of another software module, enterprise application, or hardware module without departing from the scope of the present disclosure.

The computer 902 includes an interface 906. Although illustrated as a single interface 906 in FIG. 9, two or more interfaces 906 can be used according to implementations of the computer 902 and the described functionality. The interface 906 can be used by the computer 902 for communicating with other systems that are connected to the network 924 (whether illustrated or not) in a distributed environment. Generally, the interface 906 can include, or be implemented using, logic encoded in software or hardware (or a combination of software and hardware) operable to communicate with the network 924. More specifically, the interface 906 can include software supporting one or more communication protocols associated with communications. As such, the network 924 or the interface's hardware can be operable to communicate physical signals within and outside of the illustrated computer 902.

The computer 902 includes a processor 908. Although illustrated as a single processor 908 in FIG. 9, two or more processors 908 can be used according to implementations of the computer 902 and the described functionality. Generally, the processor 908 can execute instructions and can manipulate data to perform the operations of the computer 902, including operations using algorithms, methods, functions, processes, flows, and procedures as described in the present disclosure.

The computer 902 also includes a database 920 that can hold data (such well data 922) for the computer 902 and other components connected to the network 924 (whether illustrated or not). For example, database 920 can be in-memory or a database storing data consistent with the present disclosure. In some implementations, database 920 can be a combination of two or more different database types (for example, hybrid in-memory and conventional databases) according to implementations of the computer 902 and the described functionality. Although illustrated as a single database 920 in FIG. 9, two or more databases (of the same, different, or combination of types) can be used according to implementations of the computer 902 and the described functionality. While database 920 is illustrated as an internal component of the computer 902, in alternative implementations, database 920 can be external to the computer 902.

The computer 902 also includes a memory 910 that can hold data for the computer 902 or a combination of components connected to the network 924 (whether illustrated or not). Memory 910 can store any data consistent with the present disclosure. In some implementations, memory 910 can be a combination of two or more different types of memory (for example, a combination of semiconductor and magnetic storage) according to implementations of the computer 902 and the described functionality. Although illustrated as a single memory 910 in FIG. 9, two or more memories 910 (of the same, different, or combination of types) can be used according to implementations of the computer 902 and the described functionality. While memory 910 is illustrated as an internal component of the computer 902, in alternative implementations, memory 910 can be external to the computer 902.

The application 912 can be an algorithmic software engine providing functionality according to implementations of the computer 902 and the described functionality. For example, application 912 can serve as one or more components, modules, or applications. Further, although illustrated as a single application 912, the application 912 can be implemented as multiple applications 918 on the computer 902. In addition, although illustrated as internal to the computer 902, in alternative implementations, the application 912 can be external to the computer 902.

The computer 902 can also include a power supply 918. The power supply 918 can include a rechargeable or non-rechargeable battery that can be configured to be either user- or non-user-replaceable. In some implementations, the power supply 918 can include power-conversion and management circuits, including recharging, standby, and power management functionalities. In some implementations, the power-supply 918 can include a power plug to allow the computer 902 to be plugged into a wall socket or a power source to, for example, power the computer 902 or recharge a rechargeable battery.

There can be any number of computers 902 associated with, or external to, a computer system including the computer 902, with each computer 902 communicating over network 924. Further, the terms "client," "user," and other appropriate terminology can be used interchangeably, as appropriate, without departing from the scope of the present disclosure. Moreover, the present disclosure contemplates that many users can use one computer 902 and one user can use multiple computers 902.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random-access memory (RAM), read only memory (ROM), phase change memory (PRAM), static random-access memory (SRAM), dynamic random-access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks.

While this specification contains many specific implementation details, these should not be construed as limitations on the scope of what may be claimed, but rather as descriptions of features that may be specific to implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Several implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

Several embodiments of these systems and methods have been described. Nevertheless, it will be understood that various modifications may be made without departing from the spirit and scope of this disclosure. Accordingly, other embodiments are within the scope of the following claims.

Several embodiments have been described. Nevertheless, it will be understood that various modifications may be made without departing from the scope of the data processing system described herein. Accordingly, other embodiments are within the scope of the following claims.

What is claimed is:

1. A method for drilling a well in a subsurface, the method comprising:
    obtaining reservoir data comprising geophysical data, petrophysical data, or drilling data;
    generating a reference three-dimensional (3D) geo-steering model, the reference 3D geo-steering model comprising a projected well path based on the geophysical data;
    receiving, from one or more sensors in the well, the one or more sensors being associated with a drilling bit, real-time Logging While Drilling (LWD) data, the real-time LWD data including updated geophysical data, updated petrophysical data, or updated drilling data;
    validating one or more parameter values of the reference 3D geo-steering model by determining that a discrepancy exceeds a threshold limit between the one or more parameter values of the reference 3D geo-steering model and one or more real-time parameter values, wherein the parameter values are generated from the reservoir data and the real-time LWD data, further comprising:
responsive to determining that the discrepancy between the one or more parameter values of the reference 3D geo-steering model and the one or more real-time parameter values exceeds the threshold limit, updating at least one parameter value of the one or more parameter values;
updating a dynamic weight associated with at least one parameter value of the one or more parameter values, wherein the dynamic weight represents a correlation between the at least one parameter value and one or more corresponding real-time parameter values;
updating the reference 3D geo-steering model by using the updated at least one parameter value and the updated dynamic weight;
generating, using the updated reference 3D geo-steering model, an updated well path in the subsurface for controlling the drilling bit;
sending, to the drilling bit in the well, the updated well path;
generating steering instructions based on the updated well path; and
controlling azimuthal 3D steering of the well based on the steering instructions.

2. The method of claim 1, wherein the updated well path comprises an in-situ 3D well trajectory within a measurable volume of the one or more sensors with azimuthal (3D) value.

3. The method of claim 1, wherein the updated reference 3D geo-steering model comprises a micro-scale sub-seismic property change and a direction of change in three dimensions that is configurable for upscaling.

4. The method of claim 1, wherein validating the reference 3D geo-steering model further comprises:
generating, using a real-time geo-steering model, the updated well path that is different from the projected well path of the reference 3D geo-steering model, wherein the updated reference 3D geo-steering model is used as a new reference to a real-time geo-steering model.

5. The method of claim 1, further comprising generating a visualization of the reference and the updated well path in the subsurface.

6. The method of claim 1, wherein validating the one or more parameter values of the reference 3D geo-steering model based on the real-time LWD data comprises:
applying a machine learning model to the real-time LWD data to generate an updated geo-steering model; and
comparing, for a specific depth value, the one or more parameter values of the reference 3D geo-steering model with corresponding respective updated parameter values of the updated geo-steering model.

7. The method of claim 1, wherein continuously updating the reference 3D geo-steering model using the updated at least one parameter value and the updated dynamic weight further comprises:
selecting one or more parameter values to update the reference 3D geo-steering model based on the dynamic weight of each of the one or more parameter values.

8. A system for drilling a well in a subsurface, the system comprising:
one or more sensors in a well;
a drill; and
a controller in communication with the one or more sensors and the drill, the controller comprising one or more processors configured to perform operations comprising:
obtaining reservoir data comprising geophysical data, petrophysical data, or drilling data;
generating a reference three-dimensional (3D) geo-steering model, the reference 3D geo-steering model comprising a projected well path based on the geophysical data;
receiving, from the one or more sensors in the well, the one or more sensors being associated with the drill, real-time Logging While Drilling (LWD) data, the real-time LWD data including updated geophysical data, updated petrophysical data, or updated drilling data;
validating one or more parameter values of the reference 3D geo-steering model by determining that a discrepancy exceeds a threshold limit between the one or more parameter values of the reference 3D geo-steering model and one or more real-time parameter values, wherein the parameter values are generated from the reservoir data and the real-time LWD data, further comprising:
responsive to determining that the discrepancy between the one or more parameter values of the reference 3D geo-steering model and the one or more real-time parameter values exceeds the threshold limit, updating at least one parameter value of the one or more parameter values;
updating a dynamic weight associated with at least one parameter value of the one or more parameter values, wherein the dynamic weight represents a correlation between the at least one parameter value and one or more corresponding real-time parameter values;
updating the reference 3D geo-steering model by using the updated at least one parameter value and the updated dynamic weight;
generating using the updated reference 3D geo-steering model, an updated well path in the subsurface for controlling the drill;
sending, to the drill in the well, the updated well path;
generating steering instructions based on the updated well path; and
controlling azimuthal 3D steering of the well based on the steering instructions.

9. The system of claim 8, wherein the updated well path comprises an in-situ 3D well trajectory within a measurable volume of the one or more sensors with azimuthal (3D) value.

10. The system of claim 8, wherein the updated reference 3D geo-steering model comprises a micro-scale sub-seismic property change and a direction of change in three dimensions that is configurable for upscaling.

11. The system of claim 8, wherein validating the reference 3D geo-steering model further comprises:
generating, using a real-time geo-steering model based on the updated reference 3D geo-steering model, the updated well path that is different from the projected well path of the reference 3D geo-steering model.

12. The system of claim 8, the operations further comprising generating a visualization of the reference and the updated well path.

13. The system of claim 8, wherein validating the one or more parameter values of the reference 3D geo-steering model based on the real-time LWD data comprises:

applying a machine learning model to the real-time LWD data to generate an updated geo-steering model; and comparing, for a specific depth value, the one or more parameter values of the reference 3D geo-steering model with corresponding respective updated parameter values of the updated geo-steering model.

14. The system of claim 8, wherein continuously updating the reference 3D geo-steering model using the updated at least one parameter value and the updated dynamic weight further comprises:

selecting one or more parameter values to update the reference 3D geo-steering model based on the dynamic weight of each of the one or more parameter values.

15. One or more non-transitory computer readable media storing instructions that, when executed by one or more processors, cause the one or more processors to perform operations comprising:

obtaining reservoir data comprising geophysical data, petrophysical data, or drilling data;

generating a reference three-dimensional (3D) geo-steering model, the reference 3D geo-steering model comprising a projected well path based on the geophysical data;

receiving, from one or more sensors in a well, the one or more sensors being associated with a drilling bit, real-time Logging While Drilling (LWD) data, the real-time LWD data including updated geophysical data, updated petrophysical data, or updated drilling data;

validating one or more parameter values of the reference 3D geo-steering model by determining that a discrepancy exceeds a threshold limit between the one or more parameter values of the reference 3D geo-steering model and one or more real-time parameter values, wherein the parameter values are generated from the reservoir data and the real-time LWD data, further comprising:

responsive to determining that the discrepancy between the one or more parameter values of the reference 3D geo-steering model and the one or more real-time parameter values exceeds the threshold limit, updating at least one parameter value of the one or more parameter values;

updating a dynamic weight associated with at least one parameter value of the one or more parameter values, wherein the dynamic weight represents a correlation between the at least one parameter value and one or more corresponding real-time parameter values;

updating the reference 3D geo-steering model by using the updated at least one parameter value and the updated dynamic weight;

generating using the updated reference 3D geo-steering model, an updated well path in a subsurface for controlling the drilling bit;

sending, to the drilling bit in the well, the updated well path;

generating steering instructions based on the updated well path; and controlling azimuthal 3D steering of the well based on the steering instructions.

16. The one or more non-transitory computer readable media of claim 15, wherein the updated well path comprises an in-situ 3D well trajectory within a measurable volume of the one or more sensors with azimuthal (3D) value.

17. The one or more non-transitory computer readable media of claim 15, wherein the updated reference 3D geo-steering model comprises a micro-scale sub-seismic property change and a direction of change in three dimensions that is configurable for upscaling.

18. The one or more non-transitory computer readable media of claim 15, wherein validating the reference 3D geo-steering model further comprises:

generating, using a real-time geo-steering model based on the updated reference 3D geo-steering model, the updated well path that is different from the projected well path of the reference 3D geo-steering model.

19. The one or more non-transitory computer readable media of claim 15, the operations further comprising generating a visualization of the reference and the updated well path.

20. The one or more non-transitory computer readable media of claim 15, wherein continuously updating the reference 3D geo-steering model using the updated at least one parameter value and the updated dynamic weight further comprises:

selecting one or more parameter values to update the reference 3D geo-steering model based on the dynamic weight of each of the one or more parameter values.

* * * * *